United States Patent [19]

Zabala et al.

[11] Patent Number: 5,176,742
[45] Date of Patent: Jan. 5, 1993

[54] METHOD FOR FILTERING A MOLTEN SOLDER BATH

[75] Inventors: Robert J. Zabala, Schenectady; Bruce A. Knudsen, Amsterdam; Mark G. Benz, Burnt Hills, all of N.Y.; Lee E. Rumaner, Seattle, Wash.

[73] Assignee: General Electric Company, Schenectady, N.Y.

[21] Appl. No.: 767,452

[22] Filed: Sep. 30, 1991

[51] Int. Cl.⁵ .............................................. C22B 9/02
[52] U.S. Cl. ..................................... 75/407; 266/227
[58] Field of Search ................ 75/407, 697; 266/227; 427/432, 433, 123

[56] References Cited

U.S. PATENT DOCUMENTS

| | | | |
|---|---|---|---|
| 3,705,457 | 12/1972 | Tardoskegyi | 427/133 |
| 3,897,336 | 7/1975 | Bydalck et al. | 266/227 |
| 4,921,156 | 5/1990 | Hohnerlein | 427/432 |

Primary Examiner—Melvyn J. Andrews
Attorney, Agent, or Firm—James E. McGinness; James Magee, Jr.

[57] ABSTRACT

An apparatus for filtering a molten solder bath comprises, a housing having an entrance end and an exit end enclosing a channel means extending from the entrance end to a filter means adjacent the exit end. The channel means being configured for receiving molten solder at the entrance end and directing the solder to the filter means in a turbulent flow. The filter means being configured to filter particles from the flow and direct the filtered flow to the exit end. A cooling means is positioned on the housing for cooling solder flowing through the channel means without reacting with the solder. A method for filtering a molten solder bath comprises, directing solder from the bath in a turbulent flow and cooling the flow to form a precipitate of an impurity in the molten solder. The cooled flow is filtered to remove particles and form a high-purity solder, and the high-purity solder is returned to the bath. Preferably, the molten solder is protected by an inert atmosphere that does not react with the solder.

2 Claims, 2 Drawing Sheets

METHOD FOR FILTERING A MOLTEN SOLDER BATH

BACKGROUND OF THE INVENTION

This invention relates to a method and apparatus for filtering molten solder, and in particular for removing soluble impurities from solder.

Solder is a tin-lead alloy comprised of from about 2 to 70 weight percent tin and the balance lead. Impurities in the solder can affect soldering performance and must be kept to a minimum. Standards for solder alloys set maximum tolerable impurities in alloy as provided by a supplier or refinery. Impurities can be inadvertently picked up during normal usage of the alloys, especially when solder pots with recirculation systems and passage of components through the molten materials are used. Impurities present in sufficient quantities can affect wetting properties, flow within the joint, melting temperature of the solder, strength capabilities of joints, and oxidation characteristics of the solder alloys.

For example, a molten tin-lead solder bath is capable of dissolving copper at a high rate, easily reaching 0.4 weight percent copper and higher. Copper in liquid can settle to the bottom of a solder bath as an intermetallic compound sludge, or precipitate in the solder as particles of the copper-tin intermetallic compounds. In addition, tin oxide particless, known as dross, can form in solder exposed to air. Such particles can detrimentally affect the solder bonding process or joining apparatus by precipitating, or accumulating the precipitate into larger agglomerations and depositing on the soldered parts or on the soldering apparatus.

Additional information about soldering and molten soldering apparatus such as wave solder pump systems can be found in, American Metals Handbook, Ninth Edition. Vol. 6, 1983, pp. 1069-1101, incorporated herein by reference.

It is an object of this invention to provide a method and apparatus for filtering particles from molten solder.

It is another object of this invention to provide a method and apparatus for removing soluble impurities in solder to an impurity level below which precipitates of the impurity do not form at soldering temperatures.

BRIEF DESCRIPTION OF THE INVENTION

An apparatus for filtering a molten solder bath comprises, a housing having an entrance end and an exit end enclosing a channel means extending from the entrance end to a filter means adjacent the exit end. The channel means being configured for receiving molten solder at the entrance end and directing the solder to the filter means in a turbulent flow. The filter means being configured to filter particles from the flow and direct the filtered flow to the exit end. A cooling means is positioned on the housing for cooling solder flowing through the channel means without reacting with the solder.

A method for filtering a molten solder bath comprises, directing solder from the bath in a turbulent flow and cooling the flow to form a precipitate of an impurity in the molten solder. The cooled flow is filtered to remove particles and form a high-purity solder, and the high-purity solder is returned to the bath. Preferably, the molten solder is protected by an inert atmosphere that does not react with the solder.

DETAILED DESCRIPTION OF THE INVENTION

Figure 1:
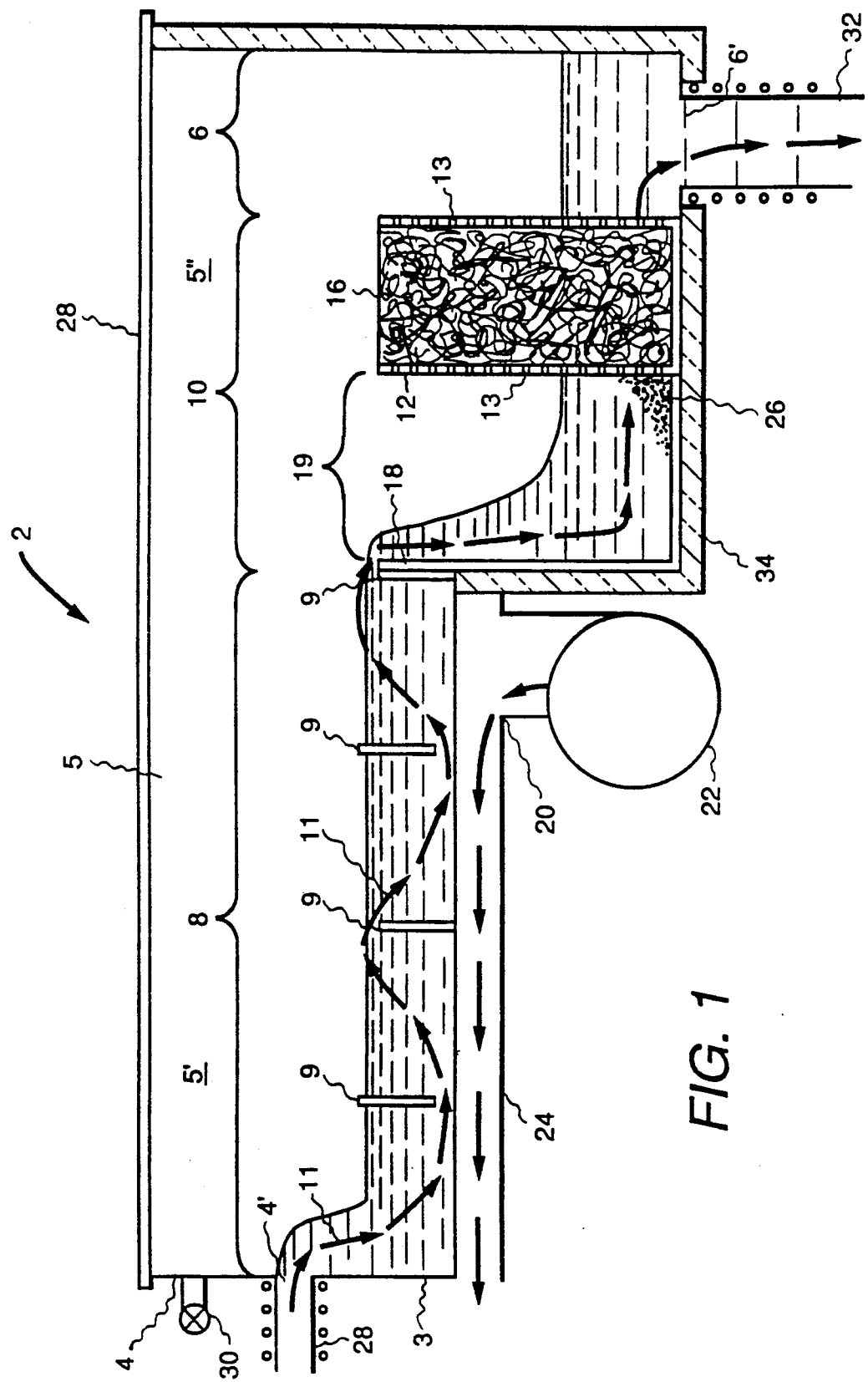
FIG. 1 is a side view of a cross-section of a side view of a molten solder filtering apparatus of this invention.

An apparatus according to this invention can be shown by making reference to FIG. 1. Filter apparatus 2 is comprised of a housing 3 having a channel means 8, and a filter means 10 positioned therein. A cooling means 20 is positioned on the housing to provide a cooling air flow to the outer surface of housing 3 where channel means 8 is located. Housing 2 is formed form a material resistant to molten solder such as tool steel or stainless steel. Housing 3 has a floor and sidewalls extending therefrom to enclose a cavity 5 having an upper cavity section 5' adjacent a lower cavity section 5". Lower cavity section 5" extends below upper cavity section 5' so that fluid flowing through upper cavity section 5' flows into the portion of lower cavity section 5" that extends below the upper cavity section 5'. Housing 2 has an entrance end 4 and an exit end 6. Entrance end 4 having an entrance port 4, through which solder enters the housing, and exit end 6 having exit port 6, through which filtered solder exits the housing.

Channel means 8 is formed on the floor of housing 3 in upper cavity section 5'. The channel means 8 is configured to direct molten solder from entrance end 4 to filter means 10 in a turbulent flow. For example, channel means 8 can be positioned at an angle so that the force of gravity causes molten solder to flow from the entrance end 4 to the filter means 10. Channel means 8 has baffles 9 extending between the sidewalls along channel means 8, the baffles being positioned at spaced intervals so that the solder flows under and over successive baffles as shown by arrows 11. Baffle means 9 are positioned below entrance port 4' so that solder flows from the entrance port 4' over the baffles 9. In another embodiment not shown, the baffles are positioned so that solder flows over each baffle to cause the turbulent flow. Baffles 9 are formed from material resistant to molten solder such as stainless steel.

Filter means 10 positioned on the floor of housing 3 in lower cavity section 5" extends from channels means 8, and is positioned in housing 2 to receive solder flowing from channels means 8. The filter means 10 is comprised of a basket 18 having an accumulator section 19, container 12, and filter 16 within container 12. Filter means 10 filters particles from the flow of molten solder and directs the filtered solder to exit end 6. Filter 16 is comprised of a material, such as steel wool, that is resistant to molten solder and can remove particles suspended in molten solder passing therethrough. Container 12 is formed from material resistant to molten solder such as stainless steel and has foraminous or screened sidewalls 13 that the molten solder can flow through while holding filter 16 therein. Accumulator section 19 of basket 18 is positioned between channel means 8 and container 12. Particles filtered from the molten solder flow by filter 16 accumulate in accumulator section 19 as deposit 26, as well as in filter 16.

Cooling means 20 is attached to housing 3 to provide cooling to the outer surface of the housing at channel means 8, and thereby cool solder flowing through the channel means without reacting with the solder. Cooling means 20 is comprised of a motor driven fan 22, and duct 24 facing the outer surface of housing 3, opposite the inner surface of channel means 8 facing the molten solder. Fan 22 provides a cooling air flow through duct 24 that cools channel means 8, and in turn cools solder flowing therethrough. Conventional control means (not shown) operatively connected to thermocouples (not shown) in the channel means monitor the temperature of the solder in channel means 8. Preferably, at least one thermocouple is positioned at the end of channel means 8 adjacent filter means 10. Fan 22 is controlled to provide a cooling air flow to channel means 8 in turn cooling solder in channel means 8 to a preselected temperature.

Preferably, accumulator section 19 and screen container 12 are formed as a single basket 18 for easy removal from housing 2 for cleaning of accumulated deposit 22 and changing of filter 16. Preferably, housing 3 is configured to provide a sealed inert atmosphere over the molten solder flowing through the housing to minimize the formation of dross. A cover 28 can be sealably mounted on housing 3 to enclose cavity 5 and seal an inert atmosphere such as argon or nitrogen therein. The inert atmosphere can be introduced into housing 3 through a conventional valve 30 in housing 3. Preferably, insulation 34 such as Fiberfrax alumina fiber or fiberglass is mounted on the outer surface of housing 3 that surrounds lower cavity 5" to minimize freezing of solder in the lower cavity.

In another preferred embodiment of the apparatus, the channel means 8 and filter means 10 are positioned below the level of the entrance port 4' so that solder freezing or particle buildup that causes clogging of the channel means or filter means does not prevent the flow of solder through entrance port 4' into the housing 3. In other words, the molten solder can pass over or overflow the channel means and filter means, and drain from the housing 3 through exit port 6' in the event the channel means or filter means becomes clogged and the solder cannot pass therethrough. Although the solder is not filtered by such overflowing, the overflow prevents spilling of the solder in the event of a failure in the operation of the channel means or filter means.

Figure 2:
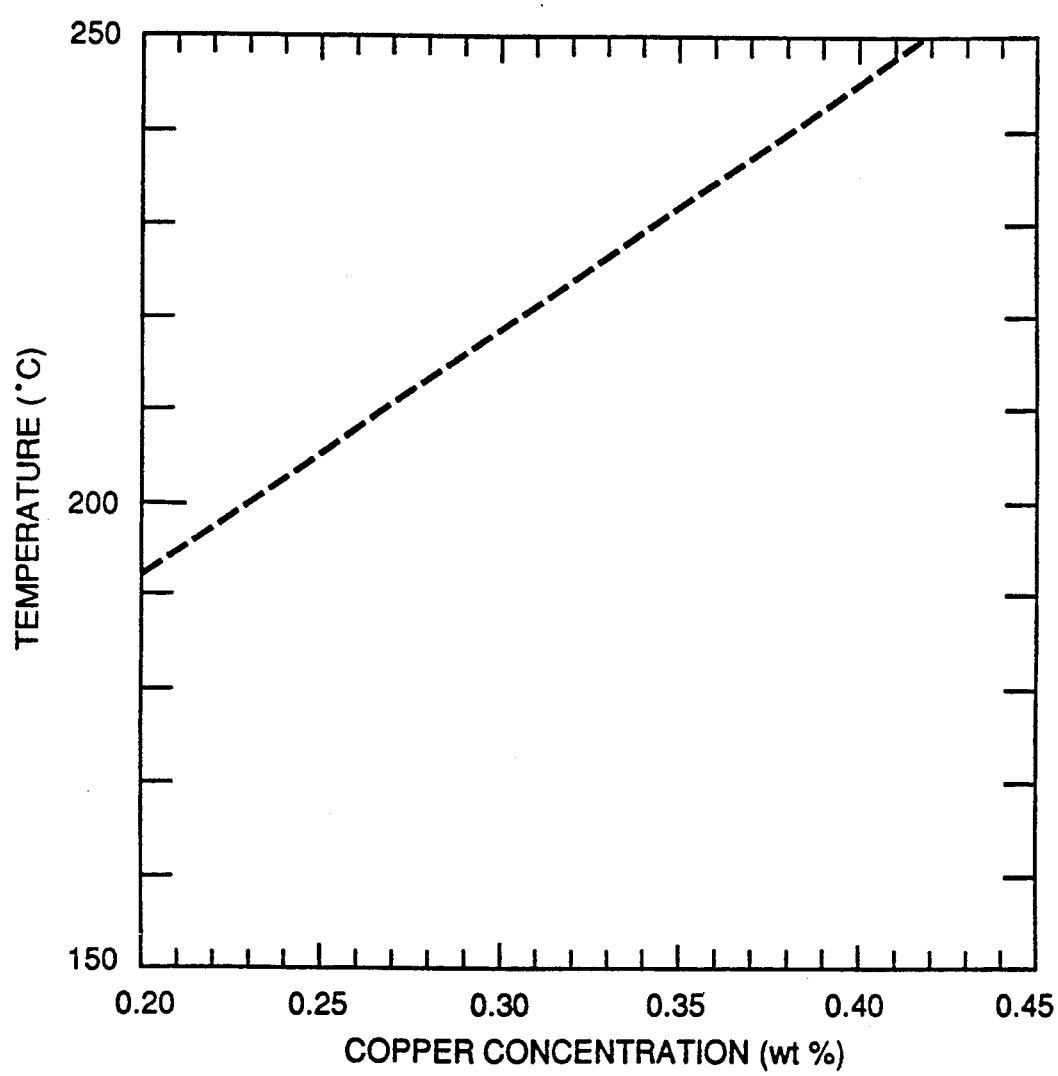
FIG. 2 is a graph showing the concentration of copper soluble in solder comprised of 67 weight percent tin and 37 weight percent lead as a function of temperature.

In operation, solder is pumped through heated pipe 28 to entrance port 4' in housing 3. Solder flows into channel means 8 passing over baffles 9 in a turbulent flow. Cooling means 20 cools channel 8 to a preselected temperature that causes precipitation of impurities dissolved in the molten solder while maintaining the solder in the molten state. For example copper dissolved in the solder bath will precipitate as particle of copper-tin intermetallic compounds. Referring to FIG. 2, the solubility of copper in a solder comprised of 63 weight percent tin and 37 weight percent lead is shown as a function of temperature.

Temperature variation in the soldering apparatus and soldering bath containing molten solder that is to be filtered in the present apparatus varies, for example by 15° to 20° C. below the desired soldering temperature. For example, at a desired soldering temperature of about 250° C., about 0.43 weight percent copper is soluble in the solder. However, the solubility of copper in the solder is reduced to about 0.35 weight percent when local temperature variations reduce the solder temperature 20° C., and the excess insoluble copper precipitates as particles of copper-tin intermetallic compounds. As a result, it is desirable to decrease the soluble copper in the molten solder to a level below where it can precipitate from the solder in the soldering apparatus or solder bath despite such temperature variations. Therefore, the copper concentration in the solder can be reduced below about 0.3 weight percent to ensure the copper-tin intermetallic compounds do not precipitate in the soldering apparatus or solder bath.

From FIG. 2 it can be seen that by cooling the solder below about 215° C. the solubility of copper is reduced below 0.3 weight percent. By cooling the channel means so that the solder is cooled to about 195°-205° C., the soluble copper concentration is reduced significantly below 0.3 weight percent, and precipitates of copper-tin intermetallics are formed reducing the dissolved copper concentration in the solder to about 0.25 weight percent. The precipitated copper-tin intermetallics are filtered from the flow by filter 16 and accumulate in accumulator section 18 as deposit 22. In addition, other particles such as dross are removed by filter 16 and accumulate in deposit 22. Filtered solder drains from housing 3 through exit port 6' and heated pipe 32 back to the solder bath for use in the solder apparatus.

What is claimed is:

1. A method for filtering a molten solder bath at a first preselect temperature for soldering comprising,
   directing solder from the bath in a turbulent flow and cooling the flow to a second preselect temperature to precipitate particles of an impurity in the molten solder,
   filtering said particles from the flow to form a high-purity solder, and
   returning the high-purity solder to the bath maintained at said first preselect temperature.

2. A method according to claim 1 wherein the molten solder is protected by an inert atmosphere that does not react with the solder.

* * * * *